United States Patent
Deakin et al.

(10) Patent No.: US 12,269,458 B2
(45) Date of Patent: Apr. 8, 2025

(54) METHOD FOR HYBRID VEHICLE EMISSIONS CONTROL

(71) Applicant: Ford Global Technologies, LLC, Dearborn, MI (US)

(72) Inventors: Peter Deakin, Hockley (GB); Justin Lloyd, Westcliff on Sea (GB)

(73) Assignee: Ford Global Technologies, LLC, Dearborn, MI (US)

( * ) Notice: Subject to any disclaimer, the term of this patent is extended or adjusted under 35 U.S.C. 154(b) by 185 days.

(21) Appl. No.: 17/979,235

(22) Filed: Nov. 2, 2022

(65) Prior Publication Data

US 2024/0140395 A1    May 2, 2024

(51) Int. Cl.
*B60W 20/16* (2016.01)
*B60W 10/06* (2006.01)
*B60W 10/08* (2006.01)

(52) U.S. Cl.
CPC ............ *B60W 20/16* (2016.01); *B60W 10/06* (2013.01); *B60W 10/08* (2013.01); *B60W 2510/068* (2013.01)

(58) Field of Classification Search
None
See application file for complete search history.

(56) References Cited

U.S. PATENT DOCUMENTS

| | | | |
|---|---|---|---|
| 8,914,172 B2 | 12/2014 | Shiino | |
| 10,928,275 B1 | 2/2021 | Dadam et al. | |
| 2011/0030344 A1 | 2/2011 | Gonze et al. | |
| 2015/0345353 A1 | 12/2015 | Kim | |
| 2018/0086334 A1* | 3/2018 | Oguma | B60W 10/08 |
| 2019/0271245 A1 | 9/2019 | De Smet et al. | |
| 2020/0240306 A1 | 7/2020 | Osemann | |
| 2020/0398819 A1* | 12/2020 | Higuchi | B60W 10/08 |
| 2023/0399968 A1 | 12/2023 | Cox et al. | |

FOREIGN PATENT DOCUMENTS

| | | |
|---|---|---|
| CN | 104234797 A | 12/2014 |
| EP | 1223323 A3 | 4/2004 |

* cited by examiner

*Primary Examiner* — Yufeng Zhang
(74) *Attorney, Agent, or Firm* — Haley Guiliano LLP

(57) ABSTRACT

Systems and methods are described for emissions control of a hybrid vehicle. An instruction to switch from a combustion engine power mode of the hybrid vehicle to an electric power mode of the hybrid vehicle is received. A temperature of a catalyst associated with a combustion engine of the hybrid vehicle is identified, where exhaust gases from the combustion engine are passed over the catalyst. If the temperature of the catalyst is at, or above, a threshold level, the hybrid vehicle is switched to the electric power mode, and the combustion engine is switched off. If the temperature of the catalyst is below the threshold level, the hybrid vehicle is switched to the electric power mode, and the catalyst temperature is maintained at, or above, the threshold level.

20 Claims, 5 Drawing Sheets

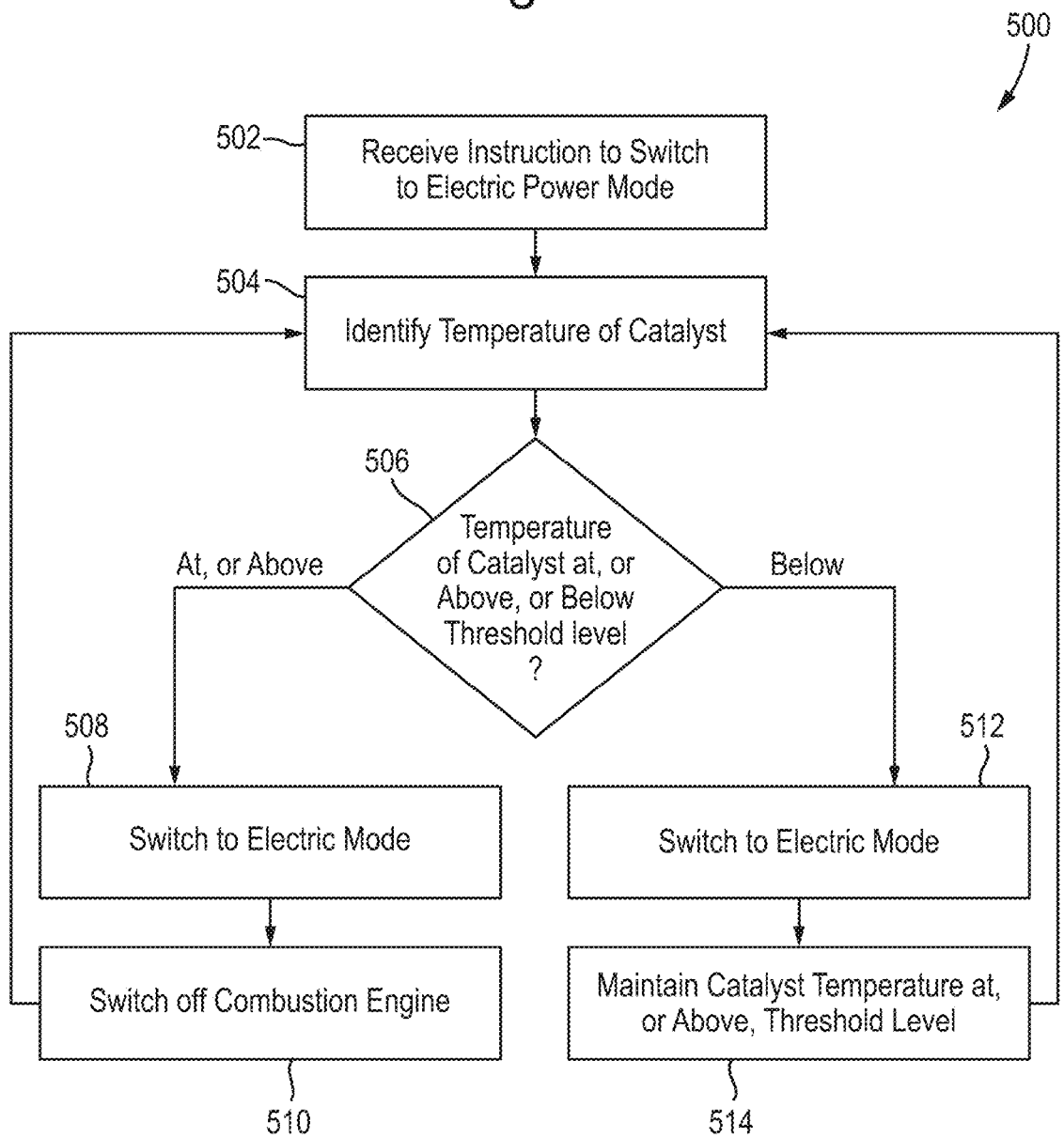

METHOD FOR HYBRID VEHICLE EMISSIONS CONTROL

BACKGROUND

The present disclosure relates to systems and methods for controlling the emissions of a hybrid vehicle and, more particularly, but not exclusively, to systems and methods related to controlling the emissions of a hybrid vehicle by maintaining the temperature of a catalyst of a catalytic converter associated with the combustion engine at, or above, a threshold level.

SUMMARY

The need for reduced engine emissions has led to hybrid vehicles, that is vehicles that are powered by an electric motor and a battery in a first mode and a combustion engine in a second mode. Some hybrid vehicles may comprise a third mode wherein the vehicle is powered by a combination of the electric motor and the combustion engine. This third mode may replace the second mode, or be in addition to the second mode. In addition, the combustion engine may be used to charge the battery. Typically, driving the hybrid vehicle for a short journey in an urban environment will cause the first mode to be engaged, and driving the hybrid vehicle for a longer journey along, for example, a highway will case the second mode to be engaged.

Driving the vehicle in the first mode leads to reduced emissions in the environment local to the hybrid vehicle; however, as a combustion engine is used for at least one mode of driving and, in some examples, for charging the battery, emissions from the combustion engine still need to be controlled. Typically, the hybrid vehicle comprises a catalytic converter that treats exhaust gases, or emissions, from the combustion engine in order to reduce harmful emissions. In addition, some vehicles may additionally comprise a particle filter for reducing particulate matter from the exhaust gases of the combustion engine. However, the catalyst of a catalytic converter works more efficiently when it is at, or above, a threshold temperature. Typically, relatively hot exhaust gases from the combustion engine heat up the catalyst as they pass over it. The nature of hybrid vehicles, where the combustion engine can be switched off frequently, can cause the temperature of the catalyst to fall below the threshold temperature and hence be less effective at treating exhaust emissions.

Systems and methods are provided herein for controlling the emissions of a hybrid vehicle. For example, the systems and methods provided herein enable the provision of a method that controls the emissions of a hybrid vehicle by maintaining the temperature of a catalyst of a catalytic converter associated with the combustion engine at, or above, a threshold level.

According to some examples of the systems and methods provided herein, a method for controlling the emissions of a hybrid vehicle is provided. An instruction to switch from a combustion engine power mode of the hybrid vehicle to an electric power mode of the hybrid vehicle is received, and a temperature of a catalyst of a catalytic converter associated with a combustion engine of the hybrid vehicle is identified, where exhaust gases from the combustion engine are passed over the catalyst. If the temperature of the catalyst is at, or above, a threshold level, the electric power mode of the hybrid vehicle is switched to and the combustion engine is switched off. If the temperature of the catalyst is below the threshold level, the electric power mode of the hybrid vehicle is switched to, and the catalyst temperature at is maintained at, or above, the threshold level. In another example, both an electric motor and the combustion engine may provide power to one or more wheels of the vehicle in the electric power mode.

In some examples, maintaining the catalyst at, or above, the threshold level may further comprise identifying a predetermined operating level of the combustion engine, and heating the catalyst by running the combustion engine at the predetermined operating level. In another example, charging a battery of the hybrid vehicle may comprise running the combustion engine at the predetermined operating level. In some examples, identifying the predetermined operating level of the combustion engine may further comprise selecting, based on a temperature of the catalyst, an operating level from a plurality of predetermined operating levels. In another example, the plurality of predetermined operating levels may be based on an efficiency of the catalyst and a temperature of the exhaust gases. In some examples, selecting the operating level is further based on an age of the catalyst.

In some examples, maintaining the catalyst at, or above, the threshold level may further comprise heating the catalyst via one or more electrical heating elements. In another example, the one or more electrical heating elements may be arranged in a heated jacket. In some examples, the threshold level is based on a light-off temperature of the catalyst.

In some examples, maintaining the catalyst at, or above the threshold level may further comprise identifying, based on whether the hybrid vehicle is located within a zero emissions zone, whether to heat the catalyst via running the combustion engine at a predetermined operating level or via one or more electrical heating elements. In another example, maintaining the catalyst at, or above the threshold level may further comprises identifying, based on a stop/start status of the hybrid vehicle, whether to heat the catalyst via running the combustion engine at a predetermined operating level or via one or more electrical heating elements. In some examples, maintaining the catalyst at, or above the threshold level may further comprise identifying, based on a cabin temperature status of the hybrid vehicle, whether to heat the catalyst via running the combustion engine at a predetermined operating level or via one or more electrical heating elements. In another example, maintaining the catalyst at, or above the threshold level may further comprises identifying, based on a battery status of the hybrid vehicle, whether to heat the catalyst via running the combustion engine at a predetermined operating level or via one or more electrical heating elements.

In some examples, the method may further comprise identifying a deceleration state of the hybrid vehicle, identifying at least a partial fuel shut off to the combustion engine, and regenerating a gasoline particulate filter that is associated with filtering exhaust gases from the combustion engine. In another example, the method may further comprise identifying a deceleration state of the hybrid vehicle, identifying at least a partial fuel shut off to the combustion engine, receiving a first input from a gasoline particulate filter model, receiving a second input from a catalyst emissions control model, and determining, based on the first and second inputs, whether to regenerate a gasoline particulate filter that is associated with filtering exhaust gases from the combustion engine or to heat the catalyst.

In some examples, when the hybrid vehicle is in the electric power mode and the combustion engine is switched off, identifying the temperature of the catalyst may further comprise identifying the temperature of the catalyst a plurality of times and, for each identification if the temperature of the catalyst is at, or above, a threshold level, the state of the combustion engine may be retained, or if the temperature of the catalyst is below the threshold level, the catalyst temperature may be maintained at, or above, the threshold level. In another example, the method may further comprise receiving an input associated with operating the vehicle in a zero emissions mode and, in response to receiving the input, maintaining the catalyst at, or above, the threshold level may further comprise heating the catalyst via one or more electrical heating elements.

An example system may comprise a hybrid vehicle comprising control circuitry configured to perform one or more of the methods described herein. The hybrid vehicle may be a car.

It shall be appreciated that other features, aspects and variations of the present disclosure will be apparent from the disclosure of the drawings and detailed description. Additionally, it will be further appreciated that additional or alternative examples of methods of and systems for controlling an electrical accessory may be implemented within the principles set out by the present disclosure.

FIGURES

The above and other objects and advantages of the disclosure will be apparent upon consideration of the following detailed description, taken in conjunction with the accompanying drawings, in which:

FIG. 5 another flowchart of illustrative steps involved in a method for controlling the emissions of a hybrid vehicle, in accordance with some examples of the disclosure.

DETAILED DESCRIPTION

Figure 1:
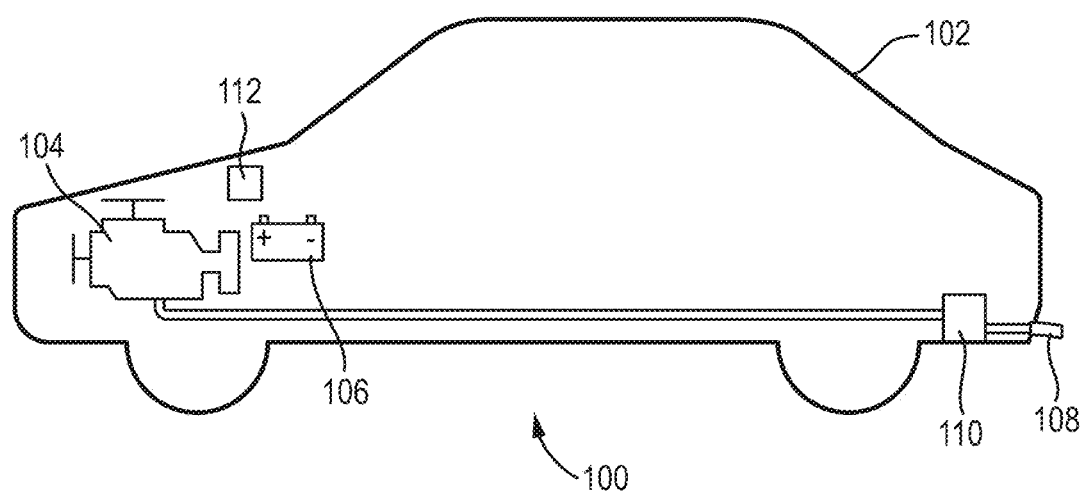
FIG. 1 illustrates a schematic diagram of hybrid vehicle having control circuitry for controlling the emissions of a hybrid vehicle, in accordance with some examples of the disclosure.

FIG. 1 illustrates a schematic diagram of hybrid vehicle having control circuitry for controlling the emissions of a hybrid vehicle, in accordance with some examples of the disclosure. A hybrid vehicle may also be a plug-in hybrid vehicle. The environment 100 comprises a hybrid vehicle, in this example, a car 102. A hybrid vehicle is any vehicle that can switch between modes in which the vehicle is powered by a combustion engine and/or a battery and one or more electric motors. In other examples, the vehicle may be any hybrid vehicle, such as a van, lorry, boat and/or airplane. The car 102 comprises a combustion engine 104 and a battery 106. The combustion engine 104 may be a gasoline combustion engine, a diesel combustion engine, or any other suitable combustion engine, and the battery 106 may be any suitable battery for use in powering the motivation a hybrid vehicle. Exhaust gases from the combustion engine 104 are emitted via the exhaust system 108. The exhaust system 108 comprises a catalytic converter 110, which utilizes a catalyst to convert certain gases from the exhaust gases of the combustion engine 104. Passing the exhaust gases over the catalyst reduces the toxic components of the exhaust gases. The catalytic converter 110 may optionally comprise a heating element and/or an electric blanket for keeping the catalyst above a threshold temperature. The exhaust system may also comprise a particle filter for reducing particulate matter from the exhaust gases of the combustion engine. In some examples, this may be a gasoline or a diesel particle filter for use with a corresponding gasoline or diesel combustion engine. The operation of the combustion engine 104 and the battery 106 is controlled by control circuitry 112, which determines when the combustion engine 104 and when the battery 106 powers the car 102. Typically, driving the hybrid vehicle for a short journey in an urban environment will cause the first mode to be engaged, and driving the hybrid vehicle for a longer journey along, for example, a highway will case the second mode to be engaged.

Figure 2:
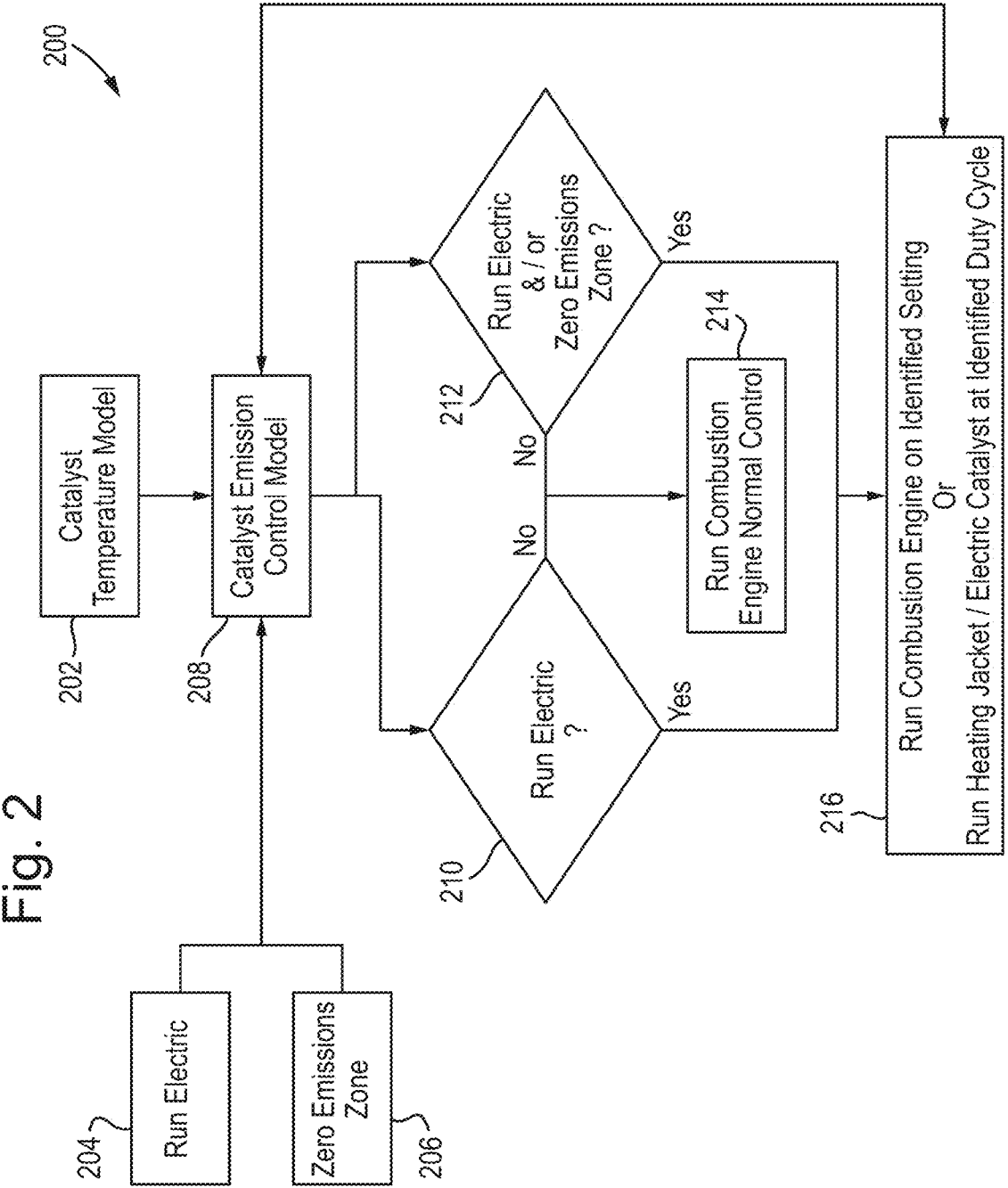
FIG. 2 illustrates a flowchart of illustrative steps involved in a method for controlling the emissions of a hybrid vehicle, in accordance with some examples of the disclosure.

FIG. 2 illustrates a flowchart of illustrative steps involved in a method for controlling the emissions of a hybrid vehicle, in accordance with some examples of the disclosure. In some examples, process 200 may run on a computing device. In other examples, process 200 may be implemented in discrete circuitry. One or more parts of the process may be controlled, for example, via control circuitry of a hybrid vehicle, such as control circuitry 112. One or more actions of the process 200 may be incorporated into or combined with one or more actions of any other process or embodiments described herein. At 202, a catalyst temperature model determines the temperature of a catalyst of a catalytic converter associated with a combustion engine, such as combustion engine 104. The catalyst temperature model 202 may receive inputs from one or more temperature sensors associated with the catalytic converter, that provide an indication of the temperature of the catalyst. At 204, it is determined whether the hybrid vehicle is to be run in an electric mode, for example, if the vehicle is travelling at relatively low speeds. In another example, an operator of the vehicle may have set a setting that indicates that the electric mode should be initiated. At 206, in an optional step, it is determined whether the hybrid vehicle is in a zero emissions zone, for example, if positioning data, such as global positioning satellite (GPS) data, indicates that the vehicle is in a zero emissions zone. A zero emissions zone may be a regulated zone, and/or may be a manufacturer identified zone, such as an area in close proximity to a school. In another example, a zero emissions mode may be manually selected by an operator of the hybrid vehicle and the vehicle may provide feedback on vehicle range based on a charge status of the battery of the hybrid vehicle. If combustion engine power is required to charge the battery and/or complete the journey, appropriate feedback may be provided to the operator of the vehicle via, for example, a notification displayed on a dashboard of the vehicle and/or an audible notification.

Outputs from the catalyst temperature model 202, the run electric step 204 and the zero emissions zone step 206 are received by the catalyst emission control model 208. In addition, either of the catalyst temperature model 202 or the catalyst emission control module 208 may take into account an aging characteristic associated with the catalyst and/or the battery. At 210, it is determined whether the electric mode is engaged, as indicated at 204. If the electric mode is not engaged, the process proceeds to step 214, where the combustion engine is run in a normal manner (i.e., to power the vehicle). If the electric mode is engaged, the process proceeds to step 216. If the optional zero emissions zone step 206 is implemented, the process proceeds from step 208 to step 212, where it is determined if the electric mode is engaged and/or whether the vehicle is in a zero emissions zone. If the vehicle is not in electric mode and is not in a zero emissions zone, the process proceeds to step 214, the combustion engine is run in a normal manner (i.e., to power the vehicle). If the electric mode is engaged and/or the vehicle is in a zero emissions zone, the process proceeds to step 216. At 216, the electric mode is engaged and movement of the hybrid vehicle is powered, at least in part, by one or more batteries and one or more electric motors. In order to keep the temperature of the catalyst above a threshold temperature (e.g., the light-off), the combustion engine is run at an identified setting (e.g., at a low level) and/or a heating jacket associated with the catalyst, or electric heating associated with the catalyst, is run at an identified duty cycle.

In some examples, the catalyst emission control model 208 may determine a level at which to run the combustion engine, in order to keep the catalyst at, or above, a threshold temperature. For example, in a warm environment, the engine may be run at a lower level than in a cold environment. If the catalyst emission control model 208 determines that the combustion engine should be run, it may be on a low setting that is governed by an output from the catalyst temperature model 202. This operating level may be variable, and under positive torque situations, at a set of fixed operating levels, so that it is not directionally proportional to input provided by an accelerator pedal of the vehicle. The number of fixed points may be determined based on the efficiency of the catalyst efficiency and the exhaust temperature. For example, the number of fixed points may be ten. Keeping the combustion engine running means that some torque may be provided to, for example, the driven wheels of the vehicle, which in turn reduces the amount of charge, or battery energy, required to drive a fixed distance. In some examples, less light off fuel is needed each time you switch back to combustion engine operating of the vehicle, from battery power.

In examples where the combustion engine runs to keep the catalyst above the threshold temperature, the vehicle may be powered by a combination of the combustion engine and the battery and electric motor, even when an electric mode is selected, and the combustion engine may only switch off when the catalyst is above the threshold temperature. In this example, the combustion engine may switch on again if the temperature of the catalyst falls below the threshold temperature. In examples where the catalyst is warmed by electronic means, such as a heating jacket, the car may run in full electric mode. By running the combustion engine and/or heating the catalyst by electronic means, the catalyst is kept above a threshold temperature, and if the hybrid vehicle switches to a mode where it is powered by the combustion engine, the emissions from the combustion engine are reduced by an optimal amount, as the catalyst is already at the threshold temperature.

Figure 3:
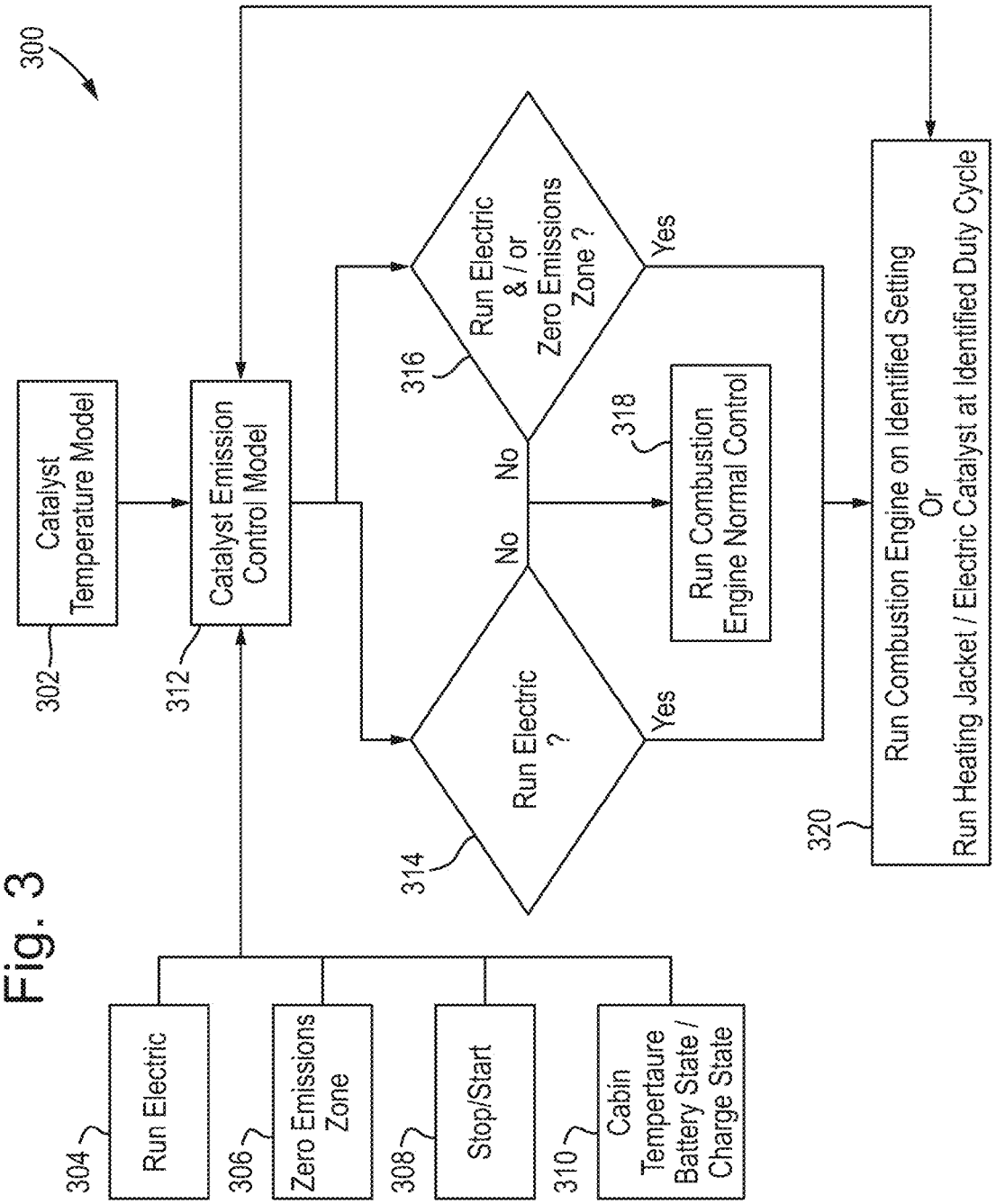
FIG. 3 illustrates another flowchart of illustrative steps involved in a method for controlling the emissions of a hybrid vehicle, in accordance with some examples of the disclosure.

FIG. 3 illustrates another flowchart of illustrative steps involved in a method for controlling the emissions of a hybrid vehicle, in accordance with some examples of the disclosure. In some examples, process 300 may run on a computing device. In other examples, process 300 may be implemented in discrete circuitry. One or more parts of the process may be controlled, for example, via control circuitry of a hybrid vehicle, such as control circuitry 112. One or more actions of the process 300 may be incorporated into or combined with one or more actions of any other process or embodiments described herein. In a similar manner to the environment shown in FIG. 2, at 302, a catalyst temperature model determines the temperature of a catalyst of a catalytic converter associated with a combustion engine, such as combustion engine 104. At 304, it is determined whether the hybrid vehicle is to be run in an electric mode. At 306, in an optional step, it is determined whether the hybrid vehicle is in a zero emissions zone. At 308, in another optional step, a stop/start status of the engine is determined, for example, whether to turn off the combustion engine when the vehicle is status. At 310, a cabin temperature, a battery state and/or a battery charge state is determined.

Outputs from the catalyst temperature model 302, the run electric step 304, the zero emissions zone step 306, the stop/start step 308 and the cabin temperature, battery state and/or battery charge state step 310 are received by the catalyst emission control model 312. In addition, either of the catalyst temperature model 302 or the catalyst emission control module 312 may take into account an aging characteristic associated with the catalyst. The catalyst control module 312 may also take into account the stop/start status of the vehicle engine. For example, stop/start interaction may be based on the light-off temperature of the catalyst. The stop/start status of the engine (i.e., determining whether to turn the engine on or off) may be calibrated based on testing emissions output and the impact in a laboratory setting and/or the real world. Engine restart may also be controlled by the need to maintain the temperature of the catalyst at a threshold temperature (e.g., the light-off temperature), as well as the current stop/start requirement of the vehicle.

At 314, it is determined whether the electric mode is engaged, as indicated at 304. If the electric mode is not engaged, the process proceeds to step 318, where the combustion engine is run in a normal manner (i.e., to power the vehicle). If the electric mode is engaged, the process proceeds to step 320. If the optional zero emissions zone step 306 is implemented, the process proceeds from step 312 to step 316, where it is determined if the electric mode is engaged and/or whether the vehicle is in a zero emissions zone. If the vehicle is not in electric mode and is not in a zero emissions zone, the process proceeds to step 318, the combustion engine is run in a normal manner (i.e., to power the vehicle). If the electric mode is engaged and/or the vehicle is in a zero emissions zone, the process proceeds to step 320. At 320, the electric mode is engaged and movement of the hybrid vehicle is powered, at least in part, by one or more batteries and one or more electric motors. In order to keep the temperature of the catalyst above a threshold temperature (e.g., the light-off), the combustion engine is run at an identified setting (e.g., at a low level) and/or a heating jacket associated with the catalyst, or electric heating associated with the catalyst, is run at an identified duty cycle.

In some examples, the catalyst emission control model 312 may determine a level at which to run the combustion engine, in order to keep the catalyst at, or above, a threshold temperature. For example, in a warm environment, the engine may be run at a lower level than in a cold environment. If the catalyst emission control model 312 determines that the combustion engine should be run, it may be on a low setting that is governed by an output from the catalyst temperature model 302. This operating level may be variable, and under positive torque situations, at a set of fixed operating levels, so that it is not directionally proportional to input provided by an accelerator pedal of the vehicle. The number of fixed points may be determined based on the efficiency of the catalyst efficiency and the exhaust temperature. For example, the number of fixed points may be ten. Keeping the combustion engine running means that some torque may be provided to, for example, the driven wheels of the vehicle, which in turn reduces the amount of charge, or battery energy, required to drive a fixed distance. In some examples, less light off fuel is needed each time you switch back to combustion engine operating of the vehicle, from battery power.

In examples where the combustion engine runs to keep the catalyst above the threshold temperature, the vehicle may be powered by a combination of the combustion engine and the battery and electric motor, even when an electric mode is selected, and the combustion engine may only switch off when the catalyst is above the threshold temperature. In this example, the combustion engine may switch on again if the temperature of the catalyst falls below the threshold temperature. In examples where the catalyst is warmed by electronic means, such as a heating jacket, the car may run in full electric mode. By running the combustion engine and/or heating the catalyst by electronic means, the catalyst is kept above a threshold temperature, and if the hybrid vehicle switches to a mode where it is powered by the combustion engine, the emissions from the combustion engine are reduced by an optimal amount, as the catalyst is already at the threshold temperature.

Figure 4:
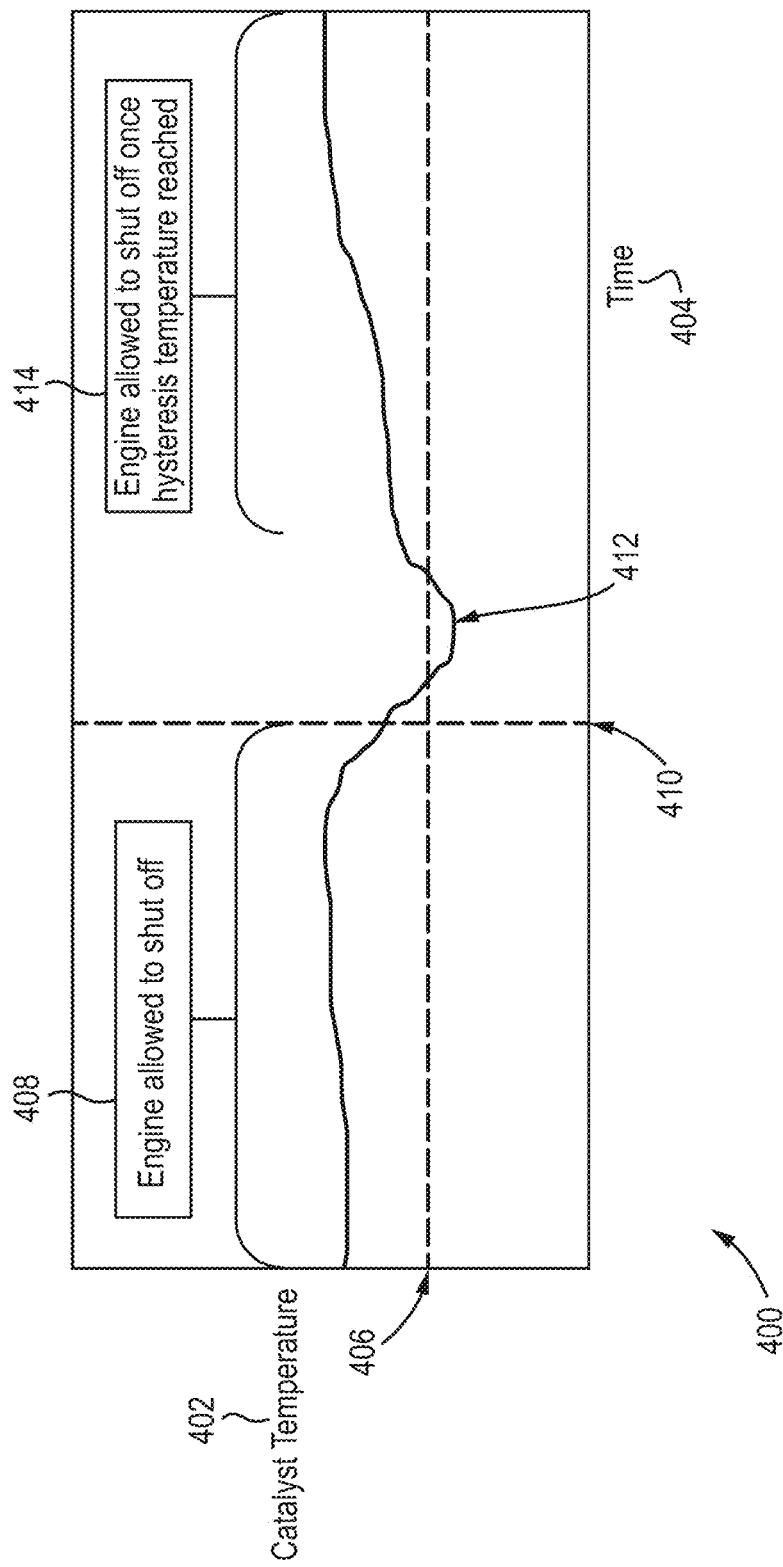
FIG. 4 illustrates an example operating profile for a hybrid vehicle for which emissions are controlled, in accordance with some examples of the disclosure.

FIG. 4 illustrates an example operating profile for a hybrid vehicle for which emissions are controlled, in accordance with some examples of the disclosure. Graph 400 indicates the temperature 402 of a catalyst with respect to time 404. The line 406 indicates a temperature threshold associated with the catalyst. Initially, the temperature of the catalyst is above the threshold temperature, so the combustion engine associated with the catalyst is allowed to shut off 408. As the engine is shut off, the temperature of the catalyst decreases with time until it approaches a threshold temperature 410. In this example, as the temperature of the catalyst falls below the threshold temperature, the combustion engine associated with the catalyst is turned on at a predetermined operating level at 412. In another example, the catalyst may be heated via electric means at 412. In a further example, the temperature of the catalyst may be heated before it falls below the threshold temperature 406. Once the temperature of the catalyst is increased, the engine (or electric heating means) is allowed to shut off at 414. Again, by running the combustion engine and/or heating the catalyst by electronic means, the catalyst is kept above a threshold temperature, and if the hybrid vehicle switches to a mode where it is powered by the combustion engine, the emissions from the combustion engine are reduced by an optimal amount, as the catalyst is already at the threshold temperature.

FIG. 5 another flowchart of illustrative steps involved in a method for controlling the emissions of a hybrid vehicle, in accordance with some examples of the disclosure. In some examples, process 500 may run on a computing device. In other examples, process 500 may be implemented in discrete circuitry. One or more parts of the process may be controlled, for example, via control circuitry of a hybrid vehicle, such as control circuitry 112. One or more actions of the process 500 may be incorporated into or combined with one or more actions of any other process or embodiments described herein. At 502, an instruction to switch a hybrid vehicle to electric power mode is received, and at 504, a temperature of a catalyst of a catalytic converter associated with a combustion engine of the hybrid vehicle is identified. At 506, it is determined whether the temperature of the catalyst is at, or above, or below a threshold level. If the temperature of the catalyst is at, or above, a threshold level, the process proceeds to step 508, where the vehicle is switched to an electric mode and the combustion engine is switched off at 510. The process may optionally loop back to step 504 at, for example, periodic intervals. If the temperature of the catalyst is below the threshold level, the process proceeds to step 512, where the vehicle is switched to an electric mode and the temperature of the catalyst of the catalytic converter is maintained at, or above, the threshold level by operating the combustion engine at a low level and/or via heating the catalyst via electronic means. Again, the process may optionally loop back to step 504 at, for example, periodic intervals.

In other examples, during deceleration of a hybrid vehicle, the battery of the hybrid vehicle may be charged via regenerative braking and, in some examples, deacceleration fuel shut-off may be utilized to run the combustion engine lean and to regenerate a particular filter, such as a gasoline particular filter, or a diesel particular filter, based on the interaction with a gasoline particular filter model, or a diesel particular filter model. In another example, it may be determined to stay on a catalyst emissions control model (i.e., to heat a catalyst of a catalytic converter associated with a combustion engine of the hybrid vehicle) rather than to regenerate a particular filter.

In another example, in cooler ambient conditions, when the combustion engine is running in a low operating mode to keep the catalyst of a catalytic converter associated with a combustion engine of the hybrid vehicle above a threshold temperature, heat from the engine can also be used to heat the cabin and hence save electrical energy. In some examples, this may be determined in using battery state, battery health and/or battery charge state linked to the request to heat the cabin of the hybrid vehicle.

While the present disclosure is described with reference to particular example applications, it will be appreciated that the disclosure is not limited hereto and that particular combinations of the various features described and defined in any aspects can be implemented and/or supplied and/or used independently. It will be apparent to those skilled in the art that various modifications and improvements may be made without departing from the scope and spirit of the present disclosure. Those skilled in the art would appreciate that the actions of the processes discussed herein may be omitted, modified, combined, and/or rearranged, and any additional actions may be performed without departing from the scope of the disclosure.

Any system features as described herein may also be provided as a method feature and vice versa. As used herein, means plus function features may be expressed alternatively in terms of their corresponding structure. It shall be further appreciated that the systems and/or methods described above may be applied to, or used in accordance with, other systems and/or methods.

Any feature in one aspect may be applied to other aspects, in any appropriate combination. In particular, method aspects may be applied to system aspects, and vice versa. Furthermore, any, some and/or all features in one aspect can be applied to any, some and/or all features in any other aspect, in any appropriate combination.

The invention claimed is:

1. A method for emissions control of a hybrid vehicle, the method comprising:
receiving an instruction to switch from a combustion engine power mode of the hybrid vehicle to an electric power mode of the hybrid vehicle;
identifying a temperature of a catalyst of a catalytic converter associated with a combustion engine of the hybrid vehicle, wherein exhaust gases from the combustion engine are passed over the catalyst; and
if the temperature of the catalyst is at, or above, a threshold level:
switching to the electric power mode of the hybrid vehicle; and
switching off the combustion engine; or
if the temperature of the catalyst is below the threshold level:
switching to the electric power mode of the hybrid vehicle; and
maintaining the catalyst temperature at, or above, the threshold level.

2. The method of claim 1, wherein maintaining the catalyst at, or above, the threshold level further comprises:
identifying a predetermined operating level of the combustion engine; and
heating the catalyst by running the combustion engine at the predetermined operating level.

3. The method of claim 2, further comprising charging a battery of the hybrid vehicle via running the combustion engine at the predetermined operating level.

4. The method of claim 2, wherein identifying the predetermined operating level of the combustion engine further comprises selecting, based on a temperature of the catalyst, an operating level from a plurality of predetermined operating levels.

5. The method of claim 4, wherein the plurality of predetermined operating levels is based on an efficiency of the catalyst and a temperature of the exhaust gases.

6. The method of claim 4, wherein selecting the operating level is further based on an age of the catalyst.

7. The method of claim 2, wherein both an electric motor and the combustion engine provide power to one or more wheels of the vehicle in the electric power mode.

8. The method of claim 1, wherein maintaining the catalyst at, or above, the threshold level further comprises heating the catalyst via one or more electrical heating elements.

9. The method of claim 8, wherein the one or more electrical heating elements are arranged in a heated jacket.

10. The method of claim 1, wherein the threshold level is based on a light-off temperature of the catalyst.

11. The method of claim 1, wherein maintaining the catalyst at, or above the threshold level further comprises:
identifying, based on whether the hybrid vehicle is located within a zero emissions zone, whether to heat the catalyst via running the combustion engine at a predetermined operating level or via one or more electrical heating elements.

12. The method of claim 1, wherein maintaining the catalyst at, or above the threshold level further comprises:
identifying, based on a stop/start status of the hybrid vehicle, whether to heat the catalyst via running the combustion engine at a predetermined operating level or via one or more electrical heating elements.

13. The method of claim 1, wherein maintaining the catalyst at, or above the threshold level further comprises:
identifying, based on a cabin temperature status of the hybrid vehicle, whether to heat the catalyst via running the combustion engine at a predetermined operating level or via one or more electrical heating elements.

14. The method of claim 1, wherein maintaining the catalyst at, or above the threshold level further comprises:
identifying, based on a battery status of the hybrid vehicle, whether to heat the catalyst via running the combustion engine at a predetermined operating level or via one or more electrical heating elements.

15. The method of claim 1, further comprising:
identifying a deceleration state of the hybrid vehicle;
identifying at least a partial fuel shut off to the combustion engine; and
regenerating a gasoline particulate filter that is associated with filtering exhaust gases from the combustion engine.

16. The method of claim 1, further comprising:
identifying a deceleration state of the hybrid vehicle;
identifying at least a partial fuel shut off to the combustion engine;
receiving a first input from a gasoline particulate filter model;
receiving a second input from a catalyst emissions control model; and
determining, based on the first and second inputs, whether to regenerate a gasoline particulate filter that is associated with filtering exhaust gases from the combustion engine or to heat the catalyst.

17. The method of claim 1 wherein:
the hybrid vehicle is in the electric power mode and the combustion engine is switched off; and
identifying the temperature of the catalyst further comprises identifying the temperature of the catalyst a plurality of times and, for each identification:
if the temperature of the catalyst is at, or above, a threshold level, retaining the state of the combustion engine; or
if the temperature of the catalyst is below the threshold level, maintaining the catalyst temperature at, or above, the threshold level.

18. The method of claim 1, further comprising:
receiving an input associated with operating the vehicle in a zero emissions mode; and, in response to receiving the input:
maintaining the catalyst at, or above, the threshold level further comprises heating the catalyst via one or more electrical heating elements.

19. A hybrid vehicle comprising control circuitry configured to perform the method of claim 1.

20. The hybrid vehicle of claim 19, wherein the vehicle is a car.

* * * * *